United States Patent [19]
Kazami et al.

[11] Patent Number: 5,687,405
[45] Date of Patent: Nov. 11, 1997

[54] CAMERA AND METHOD FOR RECORDING INFORMATION ABOUT FLASHING DEVICE

[75] Inventors: Kazuyuki Kazami; Norikazu Yokonuma, both of Tokyo; Hideo Hibino, Kawasaki, all of Japan

[73] Assignee: Nikon Corporation, Tokyo, Japan

[21] Appl. No.: 300,236

[22] Filed: Sep. 6, 1994

Related U.S. Application Data

[63] Continuation of Ser. No. 953,247, Sep. 30, 1992, abandoned.

[30] Foreign Application Priority Data

Nov. 26, 1991 [JP] Japan .................................. 3-310843

[51] Int. Cl.$^6$ ...................................................... G03B 17/24
[52] U.S. Cl. ............................ 396/155; 396/311; 396/319
[58] Field of Search ........................... 354/105, 127.1; 355/40; 396/182, 225, 310, 311, 319, 155, 164

[56] References Cited

U.S. PATENT DOCUMENTS

| | | | |
|---|---|---|---|
| 5,016,039 | 5/1991 | Sosa et al. | 354/105 |
| 5,128,708 | 7/1992 | Murayama et al. | 354/105 |
| 5,260,739 | 11/1993 | Nagata . | |

*Primary Examiner*—David M. Gray

[57] ABSTRACT

A camera capable of recording information about a color of light emission of a flashing device comprises a recording unit for recording information on a recording medium, an information acquiring unit for acquiring information about a color of light emission of the flashing device used, and a control unit for causing the recording unit to record the information about the color of light emission acquired by the information acquiring unit, on the recording medium. Information about the actual color of light emission of the flashing device at the time of photographing is thus transferred to a laboratory.

15 Claims, 5 Drawing Sheets

CAMERA AND METHOD FOR RECORDING INFORMATION ABOUT FLASHING DEVICE

This is a continuation of application Ser. No. 07/953,247 filed Sep. 30, 1992, now abandoned.

BACKGROUND OF THE INVENTION

1. Field of the Invention

The present invention relates to a camera and method for recording information about a color of light emission of a flashing device.

2. Related Background Art

A camera which records various information about photographing on a film has been known. The photographing information may be information about a color of a light source for illuminating an object. Print process may be based on the information about the color of the light source recorded on the film so that a print with a high accuracy chromatic reproduction is obtained. A natural light or a lamp as well as a flashing device are widely used as light sources to illuminate the object.

A color of light emission of the flashing device varies slightly with the type of the flashing device. For example, in a compact flashing device which is built in a conventional compact camera, a length of a light emission tube is short and the color of light emission is Nile green.

For a given flashing device, the color of light emission varies with a light emission condition. For example, when a resistor is inserted in series with the light emission tube to regulate a light emission current to generate dimmer, a light the color of light emission is reddish.

Accordingly, if only information which indicates the flash photographing is recorded as the photographing information and the print process is done based on that information, the chromatic reproduction of the print is bad if the color of light emission varies with the type of flashing device used and the light emission condition thereof.

SUMMARY OF THE INVENTION

It is an object of the present invention to provide a camera capable of recording information on a color of light emission of a flashing device.

Referring to FIG. 1, the camera of the present invention comprises recording unit 100 for record information on a recording medium, an information acquiring unit for acquiring information about a color of light emission of a flashing device to be used, and a control unit 102 for causing the recording unit 100 to record the information about the color of light emission acquired by the information acquiring unit 101, on the recording medium. Thus, when a print is to be made at a laboratory, an optimum color correction is made in accordance with the recorded informatise on the color of light emission.

In accordance with the present invention, since the information about the color of light emission of the flashing device used is recorded on the recording medium, information about the actual color of light emission of the flashing device is transferred to the laboratory so that the optimum color correction may be made at the print process in accordance with the recorded color of light emission and the print with high color reproduction accuracy is attained. No special measure to correct the color of light emission is required in connection with the flashing device.

In one of its aspects, the camera of the present invention memory may have a unit 103 for storing information about colors of light emission associated with types of flashing devices. An information acquiring unit 101A may acquire the information about the color of light emission of the flashing device mounted on the camera from the information about the colors of light emission stored in the memory unit 103. The recording unit 100 records the acquired information on the recording medium.

In accordance with the foregoing aspects of the present invention, since the information about the colors of light emission associated with the types of flashing devices is stored and the information about the color of light emission of the flashing device mounted on the camera is acquired from the stored information and recorded on the recording medium, the information about the actual color of light emission of the flashing device is transferred to the laboratory, whatever type of flashing device may be mounted on the camera, so that the optimum color correction is made at the print process in accordance with the recorded information about the color of light emission and the print with a high color reproduction accuracy is attained.

In another of its aspects, the camera of the present invention may comprise a recording unit 100 for recording information on a recording medium, a light emission condition (light emission state) detection unit 104 for detecting a light emission condition of a flashing device, and a control unit 102A for causing the recording unit 100 to record the information about the light emission condition detected by the light emission condition detection unit 104, on the recording medium. Thus, an optimum color correction may be made in a print process at a laboratory in accordance with the recorded light emission condition.

In accordance with the foregoing aspect of the present invention, since the information about the light emission condition of the flashing device is recorded on the recording medium, the optimum color correction may be made at the print process in accordance with the recorded information about the light emission condition so that the print with a high color color reproduction accuracy is attained. No special measure to correct the color of light emission is needed in correction with the flashing device.

In yet another of its aspects, the camera of the present invention may comprise a recording unit 100 for recording information on a recording medium, color of light emission detection means 105 for detecting a color of light emission of a flashing device used, and a control unit 102B for causing the recording unit 100 to record the color of light emission detected by the color of the light emission detection unit 105, on the recording medium. Thus, an optimum color correction may be made in a print process at a laboratory in accordance with the recorded color of light emission.

In accordance with the foregoing aspect of the present invention, since the color of light emission of the flashing device is detected and recorded on the recording medium, the information about actual color of light emission of the flashing device is transferred to the laboratory so that the optimum color correction may be made in the print process in accordance with the recorded information about the color of light emission and the print with a high color reproduction accuracy is attained. Further, no special measure to correct the color of light emission is needed in connection with the flashing device.

DETAILED DESCRIPTION OF THE PREFERRED EMBODIMENTS

The embodiments of the present invention are now described with reference to the accompanying drawings.

[First Embodiment]

A first embodiment of the present invention is now explained with reference to FIGS. 2 and 3.

Figure 1:
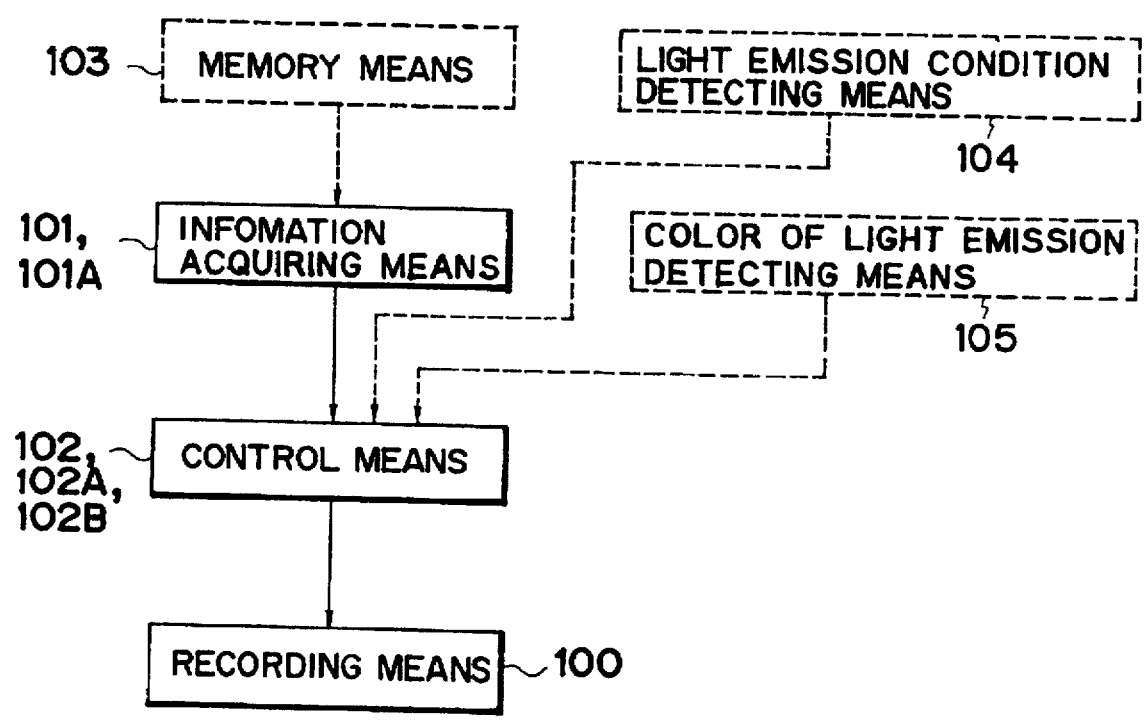
FIG. 1 shows a configuration of the present invention.
Figure 2:
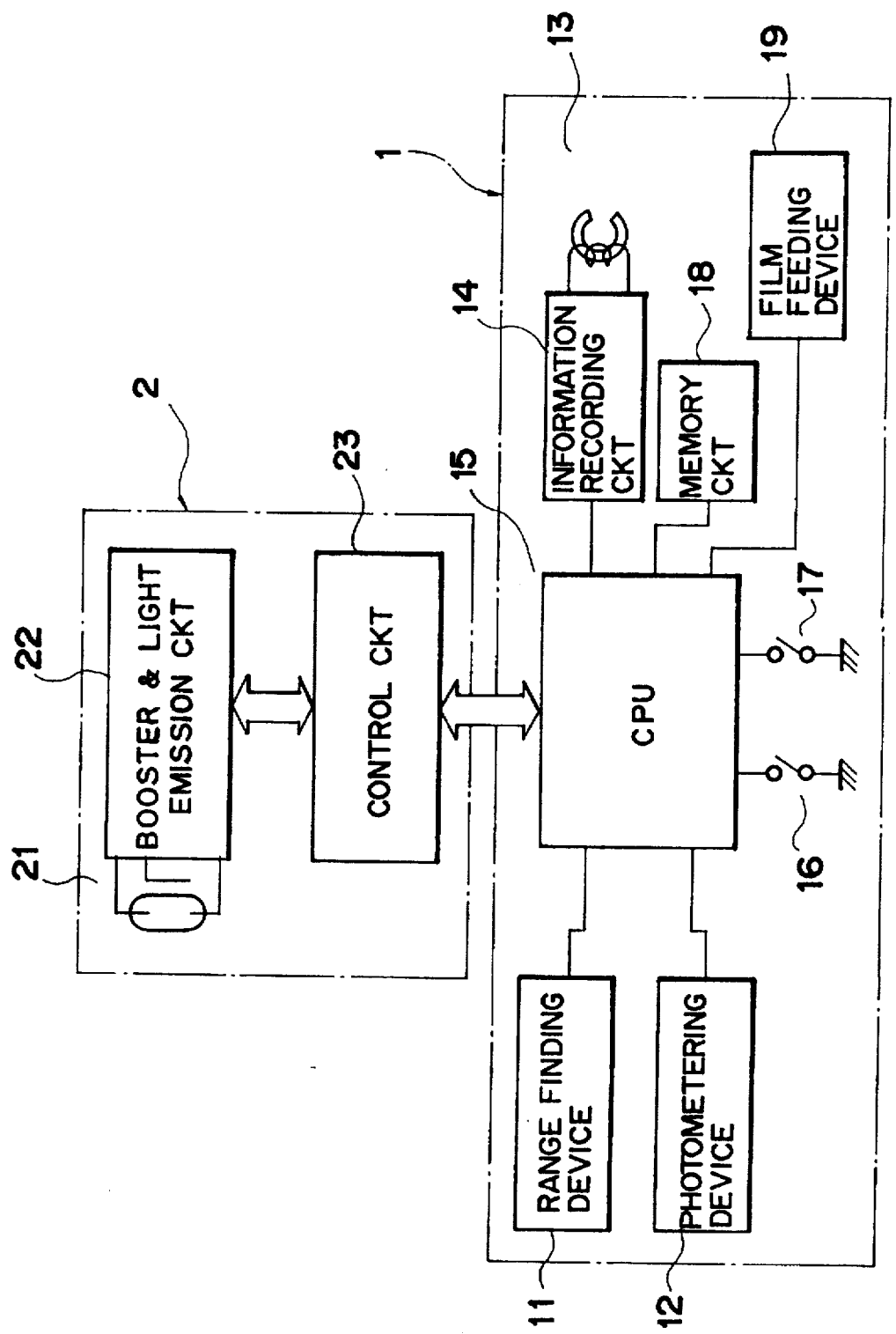
FIG. 2 shows a block diagram of a configuration of a first embodiment.

FIG. 2 shows a block diagram of a configuration of the first embodiment. A flashing device 2 is mounted on an accessory shoe, not shown, of a camera 1. Flashing devices of various types other than the flashing device 2 may be mounted on the camera 1.

The camera 1 comprises a range finding device 11 for detecting a photographing distance to an object, a photometering device 12 for photometering an object field to detect a brightness of the object, an information recording circuit 14 for recording various information about the photographing on a magnetic recording medium (hereinafter referred to as a magnetic track) applied on a film by driving a magnetic head 13, a microcomputer (hereinafter referred to as a CPU) 15 for controlling a sequence of the camera 1 and performing various arithmetic operations, a switch 16 which is turned on when a release button, not shown, is partially depressed, a switch 17 which is turned on when the release button is fully depressed, a memory circuit 18 for storing various information, and a film feeding device 19 for feeding the film. Other components of the camera 1 are not explained herein because they have no direct connection with the present invention. The information about the photographing includes information about the color of light emission of the flashing device 2.

The flashing device 2 comprises a light emission tube 21, a booster and light emission circuit 22 for applying a high voltage to the light emission tube 21 to cause it to emit a light, and a control circuit 23 for controlling the operation of the flashing device 2. Other components of the flashing device 2 are not explained herein because they have no direct connection with the present invention.

Communication between the camera 1 and the flashing device 2 is made between the CPU 15 of the camera 1 and the control circuit 23 of the flashing device 2 through contacts built in the accessory shoe. Various control commands and the information about the color of light emission of the flashing device 2 are exchanged therebetween.

Figure 3:
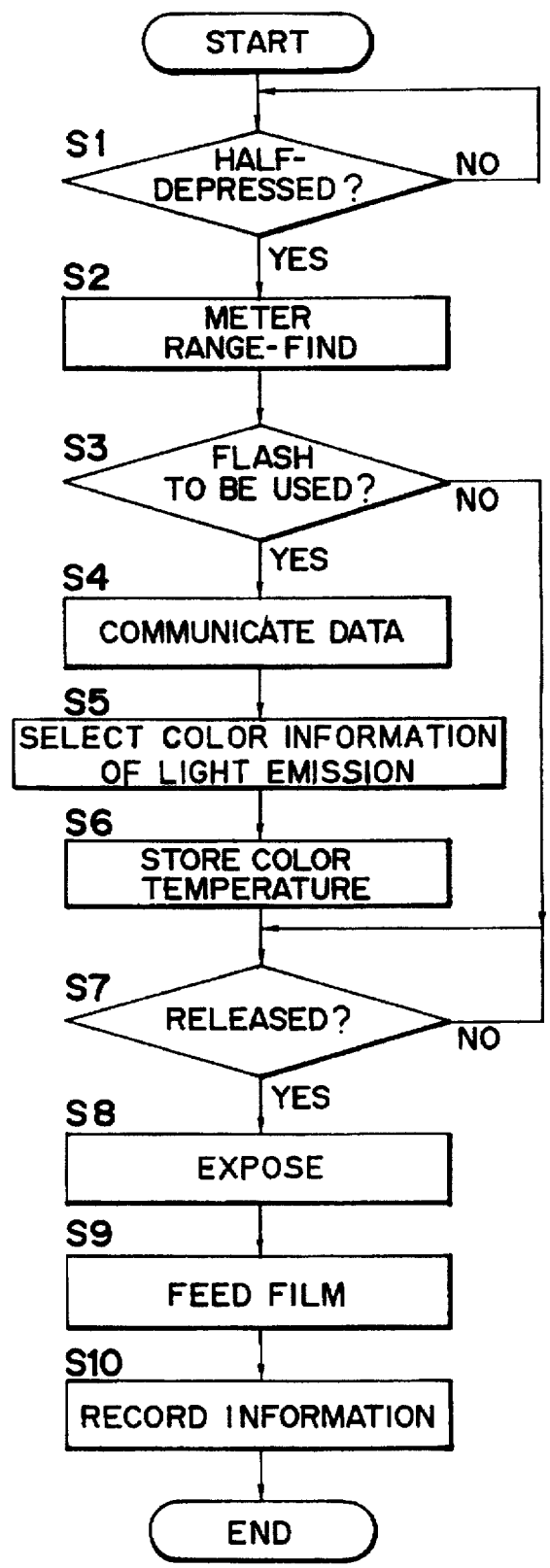
FIG. 3 shows a flow chart of an operation of the first embodiment.

FIG. 3 shows a flow chart of an operation of the first embodiment. The operation is now explained with reference to FIG. 3.

In a step S1, whether the release button was partially depressed or not is detected by the switch 16. If it was depressed, the process proceeds to a step S2 where a photographing distance is detected by the range finding device 11, and a brightness of the object is detected by the photometering device 12. In a step S3, the photographing distance and the brightness of the object detected in the above step are evaluated to determine whether the flash photographing by the flashing device 2 is to be done or not. While the photographing conditions are evaluated to determine whether the flash photographing is to be done or not in the present embodiment, the present invention is also applicable where a photographer manually sets the flash photographing by manipulating a flash photographing button, not shown. If it is determined that the flash photographing is to be done in the step S3, the process proceeds to a step S4, and otherwise the process proceeds to a step S7.

In the step S4, data is exchanged between the CPU 15 of the camera 1 and the control circuit 23 of the flashing device 2. Information such as a film sensitivity and a focal distance for conducting an optimum light emission to the photographing object is sent from the camera 1 to the flashing device 2, and information on the color of light emission inherent to the flashing device 2 is sent from the flashing device 2 to the camera 1.

The information on the color of light emission from the flashing device 2 may be a color temperature or an identification code representing a type of the flashing device 2.

In the latter case, a data table containing identification codes of flashing devices and corresponding colors of light emission may be stored in the memory circuit 18 of the camera 1, and the data table may be looked up based on the identification code acquired from the flashing device 2 to retrieve the information about the color of light emission of the flashing device 2 mounted on the camera 1.

In a step S5, the information on the color of light emission is selected from the information acquired from the flashing device 2. In a step S6, the information on the color of light emission is stored in the memory circuit 18, and the process proceeds to a step S7. In the present embodiment, the information about the color of light emission is recorded on the film only when the flash photographing is to be made.

In the step S7, whether the release was made or not is detected by the switch 17, and if it was made, the process proceeds to a step S8 for light exposure. If the flash photographing has been set, the control circuit 23 of the flashing device 2 controls the booster and light emission circuit 22 to cause the light emission tube 21 to emit a light in response to a light emission command from the camera 1. When the photographing is completed, the process proceeds to a step S9 where one-frame feed of the film is started by the film feeding device 19. In a step S10, the information on the photographing is recorded on the magnetic track of the film by the information recording circuit 14 and the magnetic head 13 in synchronism with the one-frame feed of the film. Where the flash photographing is done, the information on the photographing includes the information on the color of light emission of the flashing device 2.

Since the information about the color of light emission is acquired from the flashing device 2 mounted on the camera 1 and the information is recorded on the magnetic track of the film at the one-frame feed after the exposure, information on the actual color of light emission of the flashing device 2 is transferred to the laboratory so that the optimum color correction may be made at the print process in accordance with the recorded information about the color of light emission and the print with a high accuracy reproduction color is attained.

In the prior art compact flashing device, in order to correct the Nile green color of light emitted from a short light emission tube, a measure has been taken whereby, a protector or a diffuser is used with the tube. No such special measure is needed for the flashing device in practice of the present invention.

[Second Embodiment]

A second embodiment of the present invention in which a flashing device is built in a camera is now explained with reference to FIGS. 4 and 5.

Figure 4:
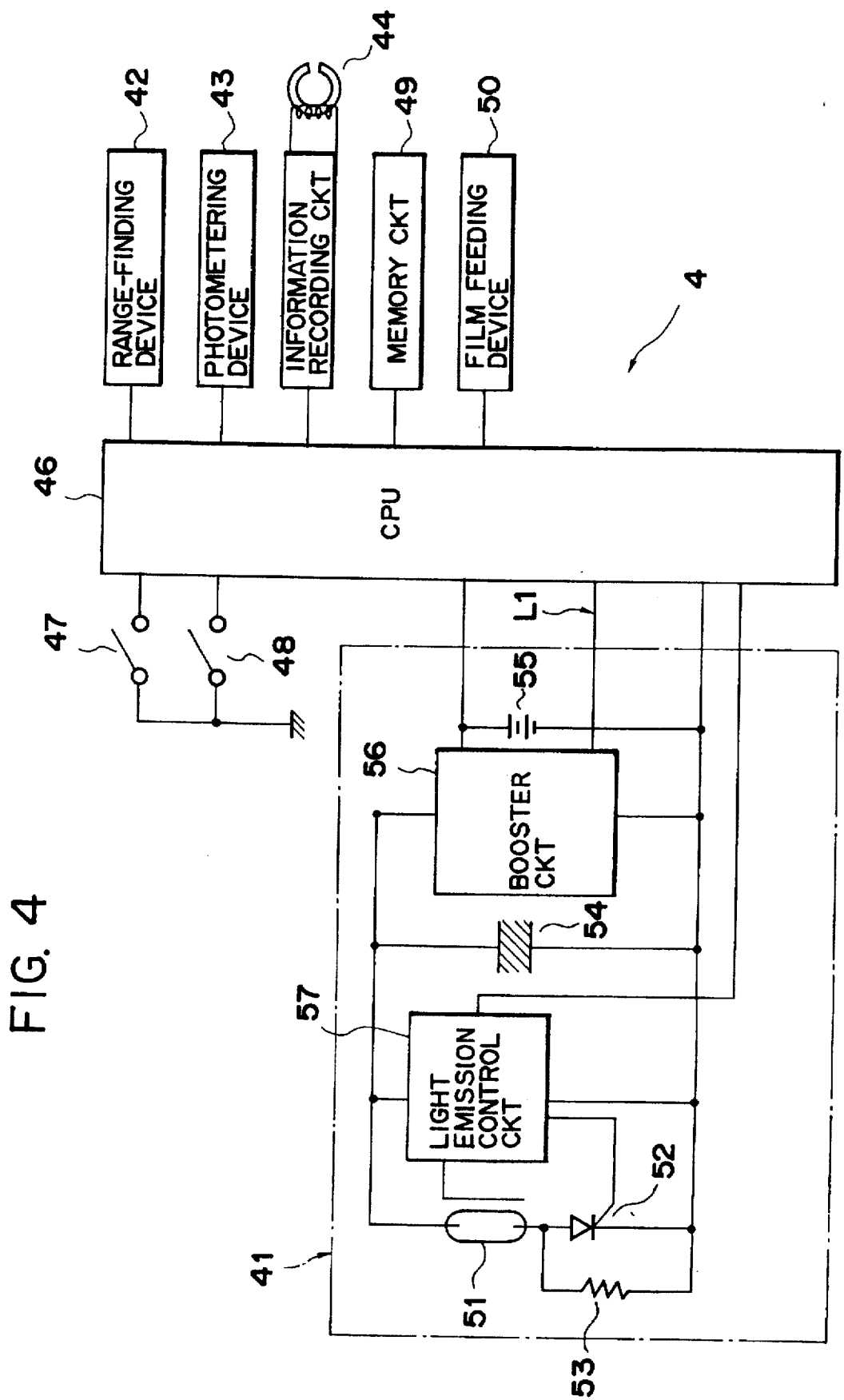
FIG. 4 shows a block diagram of a configuration of a second embodiment.

FIG. 4 shows a block diagram of a configuration of the second embodiment. A camera 4 having a flashing device built therein comprises a light emission unit 41 for emitting a flash light, a range finding device 42 for detecting a photographing distance to an object, a photometering device 43 for photometering an object field to detect a brightness of the object, an information recording circuit 45 for recording various information about photographing on a magnetic track on a film by driving a magnetic head 44, a CPU 46 for controlling a sequence of the camera 4 and performing various arithmetic operations, a switch 47 which is turned on when a release button, not shown, is partially depressed, a switch 48 which is turned on when the release button is fully depressed, a memory circuit 49 for storing various information, and a film feeding device 50 for feeding the film. Other components of the camera 4 are not explained herein because they have no direct connection with the present invention.

The light emission unit 41 comprises a light emission tube 51, a thyristor 52, a resistor 53, a capacitor 54, a battery 55, a booster circuit 56 for boosting a terminal voltage of the battery 55, and a light emission control circuit 57 for controlling the light emission. L1 denotes a signal line for controlling the booster circuit 56 by the CPU 46, and L2 denotes a signal line for controlling the light emission control circuit 57 by the CPU 46.

The light emission unit 41 has two light emission modes, a normal light emission mode in which light is emitted at a full level, and a dim light emission mode in which light is emitted at a lower level, and one of the light emission modes is selected by the CPU 46 in accordance with the photographing condition. In the normal light emission mode, the thyristor 52 is rendered conductive by the light emission control circuit 57 and a maximum current flows from the capacitor 54 which is charged up with the voltage of the battery 55 boosted by the booster circuit 56, through the light emission tube 51 and the thyristor 52. As a result, the light emission tube 51 emits the light at the full level. In the dim light emission mode, the thyristor 52 is rendered non-conductive and the current flows from the capacitor 54 through the light emission tube 51 and the resistor 53. In this case, the current is regulated by the resistor 53 so that the light emission tube 51 emits the light at the lower level.

Figure 5:
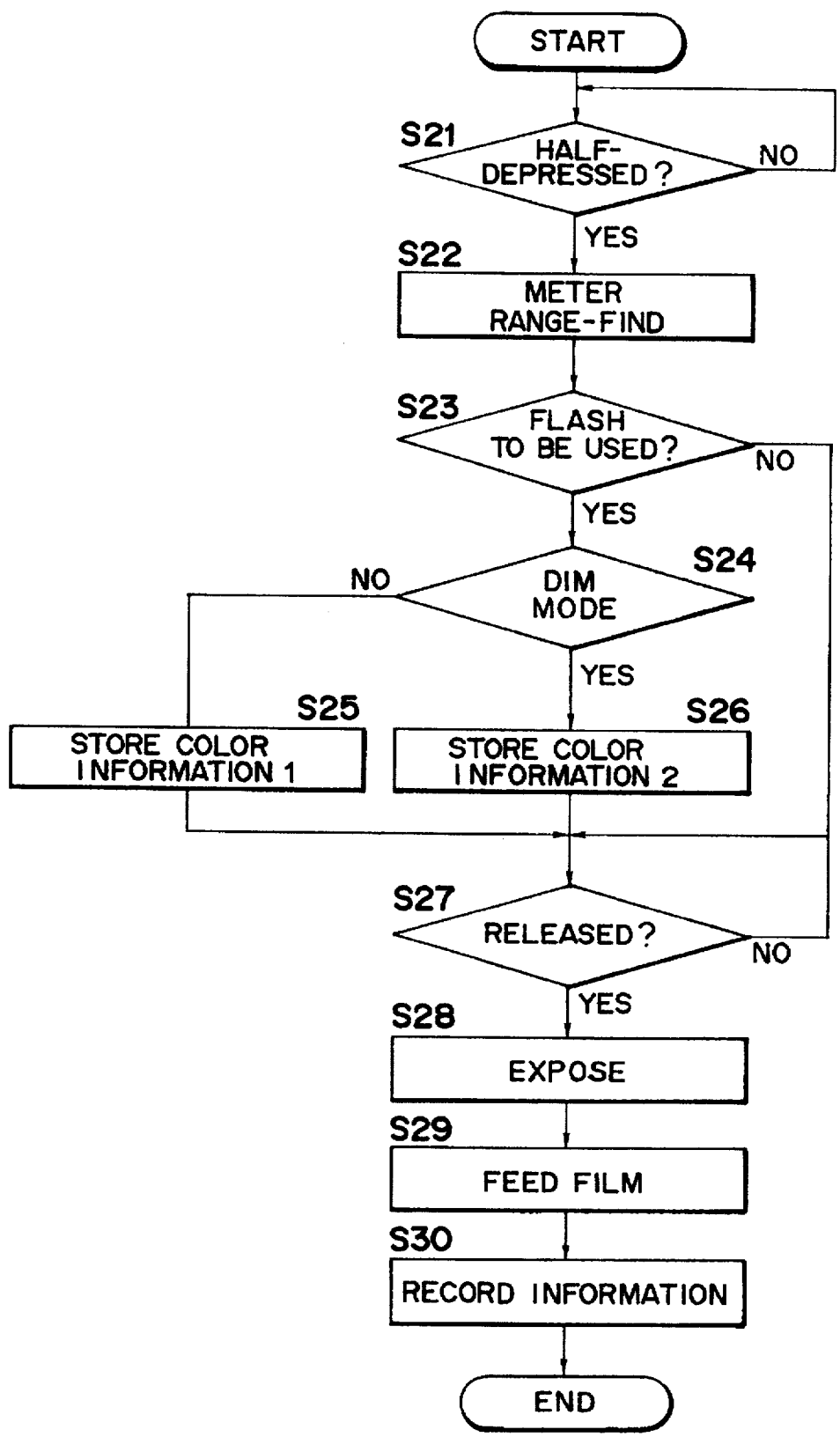
FIG. 5 shows a flow chart of an operation of the second embodiment.

FIG. 5 shows a flow chart of an operation of the second embodiment. The operation is now explained with reference to FIG. 5.

In a step S21, whether the release button was partially depressed or not is detected by the switch 47. If it was depressed, the process proceeds to a step S22 where the photographing distance is detected by the range finding device 42 and the brightness of the object is detected by the photometering device 43. In a step S23, the photographing conditions, that is, the photographing distance and the brightness of the object detected in the above step are evaluated to determine whether the flash photographing by the light emission unit 41 is to be made or not. While the photographing conditions are evaluated to determine whether the flash photographing is to be made or not in the present embodiment, the present invention may also be applied where the photographer manually sets the flash photographing by manipulating a flash photographing button, not shown. If it is determined that the flash photographing is to be made in the step S23, the process proceeds to a step S24, and otherwise the process proceeds to a step S27.

In the step S24, a light emission mode is selected in accordance with the photographing conditions. In the present embodiment, the light emission mode is automatically selected in accordance with the photographing conditions although another selection method may be used. For example, in near distance photographing, the dim light emission mode may be automatically selected, or the photographer may set the light emission mode by a light emission mode selection button, not shown. If the normal light emission mode is selected in the step S24, the process proceeds to a step S25 where color temperature information 1 corresponding to the normal light emission mode is stored in the memory circuit 49. If the dim light emission mode is selected, the process proceeds to a step S26 where color temperature information 2 corresponding to the dim light emission mode is stored in the memory circuit 49.

In the step S27, whether the release was made or not is detected by the switch 48, and if it was made, the process proceeds to a step S28 for light exposure. If the flash photographing has been set, the light emission unit 41 causes the light emission tube 51 to emit the light at the full level or lower level in response to the light emission command from the CPU 46. When the photographing is completed, the process proceeds to a step S29 where one-frame feed of the film is started by the film feeding device 50. In a step S30, the information on the photographing is recorded on the magnetic track of the film by the information recording circuit 45 and the magnetic head 44 in synchronism with the one-frame feed of the film. Where the flash photographing is set, the information about the photographing includes color temperature information corresponding to the light emission mode of the light emission unit 41.

In the second embodiment, the color temperature is determined based on the light emission mode and it is recorded on the magnetic track of the film, although the light emission mode may be directly recorded on the magnetic track of the film.

Since the light emission mode of the light emission unit 41, that is, the light emission condition is detected and the color temperature information corresponding to the light emission condition is recorded on the magnetic track of the film, information about the actual color temperature of the light emission unit 41 is transferred to the laboratory as in the first embodiment so that the optimum color correction may be made at the print process in accordance with the recorded information about the color temperature and the print with a high accuracy color reproduction is attained. Further, no special measure to correct the color of light emission is needed in connection with the light emission unit.

While the information about the color of light emission of the flashing device is magnetically recorded on the magnetic track of the film in the present embodiment, it may be recorded on a magnetic recording medium applied on a film cartridge, or it may be recorded on a recording medium such as an IC card.

In another alternative, a symbol which represents the color of light emission may be optically recorded on the film.

While the present invention is applied to a camera which uses a conventional film in the illustrative embodiments, the present invention may also be applied to an electronic still camera.

When the flashing device is mounted on the camera, the color of light emission corresponding to both the type of the flashing device and the light emission condition may be determined and recorded on the recording medium.

In the configurations of the present embodiments, the information recording circuits 14 and 45 and the magnetic heads 13 and 49 constitute the recording unit, and the microcomputers 15 and 46 constitute the information acquiring unit, the control unit, the light emission condition detection unit and the color of light emission detection unit.

What is claimed is:

1. A camera which records, on a recording medium, color information indicative of a light emission color corresponding to one of a plurality of flashing devices which is attached to or built-in the camera, the camera comprising:

a memory having pre-stored therein color information on a plurality of light emission colors corresponding to the plurality of flashing devices and including the light emission color;

an information acquiring portion which selectively acquires from said memory the color information on the light emission color corresponding to the one of the plurality of flashing devices; and a recorder for recording, on the recording medium, the color information acquired by said information acquiring portion.

2. A camera according to claim 1, wherein said information acquiring portion automatically acquires the color information corresponding to the one of the plurality of flashing devices attached to the camera.

3. A camera using a flashing device having a full light emission state and a reduced light emission state, the camera comprising:

an emission state detector which detects which one of the full light emission state and the reduced light emission state the flashing device is in from a signal directly from the flashing device or an input by a user; and a recorder which records, on a recording medium, information regarding the one of the full and reduced light emission states detected by said emission state detector.

4. A camera according to claim 3, further comprising:

a memory having pre-stored therein color information on a first light emission color of the flashing device in the full light emission state and color information on a second light emission color of the flashing device in the reduced light emission state; and wherein said recorder records, on the recording medium, the information on the one of the first and second light emission colors of the one of the full and reduced emission states detected by said emission state detector.

5. A camera which records information about a flashing device on a recording medium, comprising:

a memory having pre-stored therein color information on light emission colors for a plurality of types of flashing devices which can be mounted on the camera;

a discriminator which discriminates the type of flashing device mounted on the camera;

an information acquiring portion, responsive to said discriminator, which automatically selects and acquires from said memory the information on the light emission color corresponding to the type of flashing device mounted on the camera; and a recorder which records on the recording medium, the color information on the light emission color acquired by said information acquiring portion.

6. A camera system comprising:

a camera having a recorder which records on a recording medium;

a flashing device; and an information supplying portion, which supplies said recorder with color information peculiar to said flashing device, said color information being provided for said camera by said flashing device;

said recorder recording said color information from said information supplying portion on the recording medium.

7. A camera system according to claim 6, wherein said information supplying portion is incorporated in said camera and includes a memory having pre-stored therein color information on light emission colors for a plurality of types of flashing devices which can be mounted on the camera, said camera further includes a discriminator which discriminates the type of flashing device mounted thereon and an information acquiring portion, responsive to said discriminator, which automatically selects and acquires from said memory the color information corresponding to the type of flashing device mounted on said camera, and said recorder records the acquired information on the recording medium.

8. A camera system according to claim 6, wherein said flashing device has a full light emission state and a reduced light emission state, said camera includes an emission state detector which detects the one of the full and reduced light emission states of said flashing device, and the color information supplied by said information supplying portion corresponds to the detected light emission state.

9. A camera according to claim 6, wherein said flashing device comprises:

a battery which supplies a voltage;

a booster circuit which boosts the voltage:

a capacitor which stores the boosted voltage and; in response, producing a current;

a light emission tube having a first end connected to the capacitor to receive the current, and a second end;

a resistor and thyristor connected in parallel, wherein respective ends of said resistor and thyristor are connected to the second end of said light emission tube, said thyristor alternately conducting and not conducting the current and, in response, causing said light emission tube to alternate between a first light emission state and a second light emission state.

10. A recording method in a camera which records color information about a flashing device on a recording medium and includes a memory, the recording method comprising the steps of:

pre-storing color information on a plurality of flashing-device light emission colors in said memory;

selectively acquiring from said memory the color information on one of the plurality of light emission colors corresponding to the flashing device used by the camera; and recording said acquired information on the recording medium.

11. A recording method in a camera for recording information about a flashing device, the recording method comprising the steps of:

detecting one of a full light emission state and a reduced light emission state on a light emission intensity of said flashing device from a signal directly from the flashing device or an input by a user; and recording said detected one of said full and reduced light emission states on a recording medium.

12. A recording method in a camera for recording information about a flashing device and includes a memory, the recording method comprising the steps of:

pre-storing in said memory, information on light emission colors for a plurality of types of flashing devices which can be mounted on the camera;

discriminating the type of flashing device mounted on the camera;

automatically selecting from said memory the information on the light emission color corresponding to the mounted flashing device on the basis of said discrimination; and recording said selected information on a recording medium.

13. A camera system comprising:

a camera having a recorder for recording on a recording medium;

a flashing device; and an information supplying portion, associated with at least one of said camera and said flashing device, for pre-storing color information which is dependent upon a type of the flashing device and which identifies a light emission color of the flashing device;

said recorder recording said color information from said information supplying portion on the recording medium;

wherein said information supplying portion is incorporated in said camera and includes a memory having pre-stored therein color information on light emission colors for a plurality of types of flashing devices which can be mounted on the camera, said camera further includes a discriminator which discriminates the type of flashing device mounted thereon and an information acquiring portion, responsive to said discriminator, which automatically selects and acquires from said memory the color information corresponding to the type of flashing device mounted on said camera, and said recorder records the acquired information on the recording medium.

14. A camera system comprising:

a camera having a recorder for recording on a recording medium;

a flashing device; and an information supplying portion, associated with at least one of said camera and said flashing device, for pre-storing color information which is dependent upon a type of the flashing device and which identifies a light emission color of the flashing device;

said recorder recording said color information from said information supplying portion on the recording medium;

wherein said flashing device has a full light emission state and a reduced light emission state, said camera includes an emission state detector which detects the one of the full and reduced light emission states of said flashing device, and the color information supplied by said information supplying portion corresponds to the detected light emission state.

15. A camera system comprising:

a camera having a recorder for recording on a recording medium;

a flashing device; and an information supplying portion, associated with at least one of said camera and said flashing device, for pre-storing color information which is dependent upon a type of the flashing device and which identifies a light emission color of the flashing device;

said recorder recording said color information from said information supplying portion on the recording medium;

wherein said flashing device further comprises a battery which supplies a voltage, a booster circuit which boosts the voltage, a capacitor which stores the boosted voltage and, in response, producing a current, a light emission tube having a first end connected to the capacitor to receive the current, and a second end, and a resistor and thyristor connected in parallel, wherein respective ends of said resistor and thyristor are connected to the second end of said light emission tube, said thyristor alternately conducting and not conducting the current and, in response, causing said light emission tube to alternate between a first light emission state and a second light emission state.

* * * * *

UNITED STATES PATENT AND TRADEMARK OFFICE
CERTIFICATE OF CORRECTION

PATENT NO. : 5,687,405
DATED : November 11, 1997
INVENTOR(S) : Kazuyuki KAZAMI et al.

It is certified that error appears in the above-identified patent and that said Letters Patent is hereby corrected as shown below:

Col. 8, line 28 (claim 9), change "and; in" to --and, in--.

Signed and Sealed this

Twenty-fourth Day of March, 1998

Attest:

BRUCE LEHMAN

Attesting Officer

Commissioner of Patents and Trademarks